Patented Feb. 20, 1934

1,947,692

UNITED STATES PATENT OFFICE 1,947,692

ELECTRIC RESISTANCE

Robert Beyer, Brooklyn, N. Y., assignor to Robert Beyer Corporation, a corporation of New York No Drawing. Application February 6, 1930
Serial No. 426,434

14 Claims. (Cl. 201—76)

This invention relates to electric resistances or heating elements and has for its object the provision, as an article of manufacture, of a novel and improved electric resistance, and a method of making the same. More particularly, the invention contemplates a novel method of protecting carbon particles against oxidation at high temperatures, and a method of preparing electric resistances of such protected carbon particles, as well as the improved electric resistance produced by these methods.

The improved electric resistance of the invention comprises a compacted mass containing finely divided carbon particles protected against oxidation at high temperatures by an oxide of a metal of relatively high melting temperature. The carbon particles provide an electric current path through the compacted mass, and the resistance of this path to the passage of the electric current is susceptible of substantial variation by including in the mass varying proportions of a heat-refractory material having relatively high electrical resistance. The mixed particles of protected carbon and refractory particles are preferably bonded together with an agent or substance resistant to high temperatures.

The protection of the carbon particles against oxidation at high temperatures is one of the important features of the invention, since it permits the use of the electric resistance at unusually high temperatures. Preferably, the protecting metal oxide penetrates each particle of carbon. The penetration of the carbon particles by the metal oxide is advantageously effected by mixing the particles with an appropriate salt of a metal of relatively high melting temperature (such as manganese, tungsten, zirconium, etc.), preferably dissolved in a suitable solvent, and then heating the mixture to a sufficiently high temperature to decompose the salt and to penetrate the carbon particles with the resulting oxide of the metal.

Optimum results are attained when the carbon particles are substantially pure, and particularly when uncontaminated with phosphorous and similar impurities. I have obtained a very pure carbon by treatment of a high carbon, low silicon, cast iron, such as Swedish cast iron or iron-carbon alloy containing 6–35% of carbon, with a dilute solution (8–10%) of hydrochloric acid. The iron dissolves in the dilute acid solution and a porous spongy, graphitic mass is left behind. This spongy mass is calcined at a temperature of about 450—500° C. until all moisture and salt have been driven off. The calcination may be conducted under vacuum or in a crucible having a luted cover to exclude air. The calcined mass is crushed or comminuted to a small particle size, and is washed with water and dried at a temperature of about 200° C. to drive off moisture.

Substantially pure carbon or graphite particles may be obtained in various other ways, and are available for the practice of the invention. Ceylon flake graphite, for example, gives satisfactory results. Amorphous forms of carbon are preferable to crystalline forms, since the more nearly the carbon approaches an amorphous state the higher is its resistance to the passage of an electric current.

In the preferred practice of the invention, the finely divided carbon particles are mixed with a 15% solution of manganese nitrate or tungsten nitrate in alcohol, in about the proportion of one part of solution to four parts of carbon by volume. The resulting mixture, a somewhat heavy paste, is placed in an open crucible and heated to about 1000 to 1200° C. In the course of this heating, alcohol and nitrogen oxides are evolved and the carbon particles become penetrated with an oxide of the metal, such as an oxide of tungsten, manganese, etc.

The carbon particles, now protected against oxidation, are mixed dry with a finely divided or comminuted heat refractory material having relatively high electrical resistance, such as zirconium oxide, thorium oxide, titanium oxide, silicon carbide, aluminum oxide, cerium oxide, corundum, rutile, etc. The relative proportions of carbon and refractory material used in making up the mixture will depend, to some extent, upon the desired specific electrical resistance of the finished product, and the selection of the refractory material will depend, to some extent at least, upon the temperature to which the product is subjected in its contemplated use. In general, the mixture should contain from 20–60% by volume of the treated or protected carbon particles.

An appropriate binder or bonding agent is added to the mixture of carbon particles and refractory material. I have obtained excellent results with a specially prepared silicious bonding agent more particularly described hereinafter. Solutions of gum arabic, dextrine and the like have also given satisfactory results. Sufficient moisture or other appropriate liquid is incorporated in the mixture, as by inclusion in the bonding agent, to give an earth-wet mass and thereby provide the necessary plasticity for compacting.

Compacting of the mixed mass may be effected in various ways as, for example, by extrusion, hydraulic pressing or briquetting, molding, and the like. When preparing electric resistance rods, the mass may advantageously be extruded through a die of appropriate dimensions preferably having a central pin or core so as to produce a hollow rod. When making crucibles, the mass may conveniently be tamped into an appropriately-shaped mold. The mass may even be prepared for pouring or casting in molds.

The compacted article (such as a rod, crucible, etc.) is air-dried and then subjected to a mild drying temperature, say 150–250° F., preferably in a vacuum. It is my preferred practice to then heat the article in an appropriate furnace with exclusion of air to a temperature of about 1000–1200° C. Upon cooling, the article is immersed in or treated with a salt solution of a metal of high melting temperature, such as an alcoholic solution of manganese nitrate or chloride, tungsten nitrate or chloride etc. The article is then again heated to eliminate the alcohol and to decompose the metal salt. The purpose of this finishing treatment with the metal salt is to form a protective coating about and perhaps within the interstices of the article which prevents superficial oxidation. The final heating may be conveniently carried out by passing a gradually increasing electric current through the article until it has been heated to its contemplated working temperature.

Terminals may conveniently be attached to rods and similar forms of the electric resistance by making such terminals of hollow cylindrical form adapted to tightly fit over the ends of the rod and of considerably lower resistance than the rod. Good electrical contact between the rod and its terminals may be attained by coating the contact surfaces with a concentrated solution of silver chloride, and then heating the so-coated surfaces in contact to a bright red heat. The coating with silver chloride is preferably effected by mixing a concentrated aqueous solution of silver chloride with potassium silicate neutralized with either oxalic acid or aluminum oxalate and using the resulting mixture as the coating medium. In this manner I have obtained a very close adherence of the silver to the terminal and contacting ends of the resistance rod, thereby making a substantially perfect electric contact.

A peculiarly satisfactory bonding agent may be made of an alkali silicate in the following manner:—The alkali silicate, preferably potassium silicate of about 40° Bé., is treated (by gradual introduction therein accompanied by constant stirring) with a dilute acid, such as a 15% aqueous solution of arsenic acid, oxalic acid, tartaric acid, boric acid, or the like, until opaque aggregates or lumps form within the mass and give it a heavy, viscous and opaque appearance. The mass is then agitated, as for example in a pebble mill, until the opaque aggregates disappear, a small amount of potassium silicate being added if necessary to clear up the aggregates. To the resulting mass is then added with constant stirring about 20% by volume of distilled water containing in solution about 0.5% of chrome alum or chromic acid. The thus specially prepared and neutralized silicate is then ready to be added to the mixture of protected carbon particles and refractory material, usually in an amount of about 2–4% by volume of the silicate on the volume of the mixture.

A satisfactory mixture for electric resistances developing temperatures up to 2000° C. may be made up as follows:

7 parts by volume of silicon carbide containing about 30–35% of free carbon.
3 parts by volume of calcined zirconium oxide.
3½ parts by volume of protected carbon.

The foregoing materials are mixed dry, and to the resulting mixture is added such an amount of the neutralized silicate as to produce an earth-wet mass. This mass is then compacted, as by extruding, into the desired shape or form for the electric resistance and subjected to the finishing treatment hereinbefore described.

When silicon carbide is used as a refractory material in conjunction with silicate as the bonding agent, the latter breaks down and becomes an ineffective binder when the mixture is heated to about 1000° C. I have found that this difficulty may be overcome by adding a small amount, not exceeding 0.5% by volume, of a saturated aqueous solution of potassium permanganate, or other similar oxidizing agent, to the mixture prior to compacting.

For temperatures up to about 2000° C., I preferably protect the carbon particles with an oxide of manganese, while for higher temperatures I preferably use an oxide of tungsten. For the lower temperatures (up to 2000° C.) I prefer refractory materials like silicon carbide, zirconium oxide, etc., since these produce a tough, crystalline-like structure. For temperatures above 2000° C., I have obtained very satisfactory results with corundum, oxides of titanium or tungsten, and the like, as the refractory high electrical resistance material.

The following mixture has given excellent results in practice at temperatures approaching 3000° C.:

9 parts by volume of corundum.
1 part by volume of calcined fluorspar.
5 parts by volume of carbon protected by oxide of tungsten.

The dry mixture was made earth-wet with a solution of gum arabic or dextrin. Hollow resistance rods were formed by extrusion. The extruded rods were heated in a vacuum at a temperature gradually rising from room temperature to 180° F. After exposure to this heat treatment for several hours, the temperature was raised to 260° F., or somewhat higher, for approximately one hour. The thus dried rods were then immersed in an alcoholic solution of tungsten nitrate, preferably in a vacuum. After this treatment the rods were placed in a muffle furnace and raised to a temperature of about 2000° C. as promptly as possible.

Another mixture giving very satisfactory results at high temperatures is as follows:

30 parts by volume of corundum or corundum carbide.
25 parts by volume of cerium fluoride or calcium fluoride.
5 parts by volume of calcined fluorspar.
18 parts by volume of calcined tungstic acid.
22 parts by volume of protected carbon.

Made earth-wet with neutralized potassium silicate.

Electric resistance or heating elements made in accordance with the invention are mechanically strong and have a remarkably long useful life in constant use, or underconditions of repeated heating and cooling. Such resistances heat up very promptly upon the passage of an electric current therethrough to unusually high temperatures. At such high temperatures and exposed to atmospheric conditions, substantially no oxidation or deterioration of the resistance takes place. These resistances are of special advantage in electric resistance furnaces where high temperatures are desired. The resistance may have any appropriate physical form, such as a hollow rod, a flat strip or ribbon, a wall of a heating chamber, or a vessel such as a crucible.

I claim:

1. An electric resistance comprising a compacted mass containing finely divided carbon particles penetrated with an oxide of a metal of relatively high melting temperature.

2. An electric resistance comprising a compacted mass containing finely divided particles of carbon penetrated with an oxide of manganese.

3. An electric resistance comprising a compacted mass containing finely divided particles of carbon penetrated with an oxide of tungsten.

4. An electric resistance comprising a compacted mixture of (1) refractory material having relatively high electrical resistance and (2) carbon and (3) an appropriate bonding agent, the particles of the carbon being penetrated with an oxide of a metal of relatively high melting temperature.

5. An electric resistance comprising a compacted mass containing (1) finely divided particles of substantially pure carbon penetrated with an oxide of a metal of relatively high melting temperature and (2) refractory material having relatively high electrical resistance.

6. The method of preparing an electric resistance which comprises forming a compacted mass of a mixture of (1) refractory material having relatively high electrical resistance and (2) finely divided carbon particles penetrated with an oxide of a metal of relatively high melting temperature and (3) an appropriate bonding agent, treating said compacted mass with a solution of a salt of a metal of relatively high melting temperature, and heating the so-treated mass to a sufficiently high temperature to decompose said salt and form an oxide of said metal upon or within the mass.

7. The method of preparing an electric resistance which comprises mixing finely divided carbon with a salt of a metal of relatively high melting temperature, heating the mixture to a sufficiently high temperature to decompose said salt and penetrate the carbon particles with an oxide of said metal, forming a compacted mass of a mixture of the so-prepared carbon and refractory material having relatively high electrical resistance, drying said compacted mass, treating the dried mass with a solution of a salt of a metal of relatively high melting temperature, and heating the so-treated mass to a sufficiently high temperature to decompose said salt.

8. An electric resistance comprising a compacted mass containing finely divided carbon particles, said carbon particles being protected against oxidation at high temperature by mixing therewith, prior to compaction, a salt of a metal of relatively high melting temperature and heating the mixture to a sufficiently high temperature to convert the salt to an oxide of the metal.

9. An electric resistance comprising a compacted mass containing substantially amorphous and relatively pure carbon particles, said carbon particles being protected against oxidation at high temperature by mixing therewith, prior to compaction, a salt of a metal of relatively high melting temperature and heating the mixture to a sufficiently high temperature to convert the salt to an oxide of the metal.

10. An electric resistance comprising a compacted mixture of a refractory material having relatively high electrical resistance with carbon, said carbon being protected against oxidation at high temperature by mixing therewith, prior to compaction, a salt of a metal of relatively high melting temperature and heating the mixture to a sufficiently high temperature to convert the salt to an oxide of the metal.

11. An electric resistance comprising a compacted mixture of (1) refractory material having relatively high electrical resistance and (2) carbon protected against oxidation by mixing therewith a salt of a metal of relatively high melting temperature, and heating the mixture to a sufficiently high temperature to convert the salt to an oxide of the metal and (3) an appropriate bonding agent.

12. An electric resistance comprising a compacted mixture of (1) refractory material having relatively high electrical resistance and (2) relatively pure carbon protected against oxidation by mixing therewith a salt of a metal of relatively high melting temperature, and heating the mixture to a sufficiently high temperature to convert the salt to an oxide of the metal and (3) a silicious bonding agent.

13. An electric resistance comprising a compacted mass containing (1) carbonaceous material protected against oxidation by mixing therewith a manganese salt and heating the mixture to a sufficiently high temperature to convert the salt into manganese oxide and (2) refractory material having relatively high electrical resistance.

14. An electric resistance comprising a compacted mass containing (1) carbonaceous material protected against oxidation by mixing therewith a tungsten salt and heating the mixture to a sufficiently high temperature to convert the salt into tungsten oxide and (2) refractory material having relatively high electrical resistance.

ROBERT BEYER.